Nov. 9, 1965    D. COSTES ETAL    3,216,902
LIQUID MODERATOR NUCLEAR REACTORS
Filed July 10, 1962    3 Sheets-Sheet 1
*Fig.1*
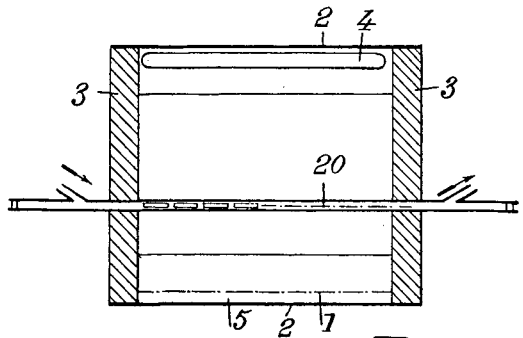
*Fig.2*
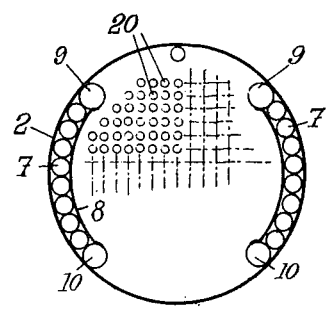
*Fig.3*
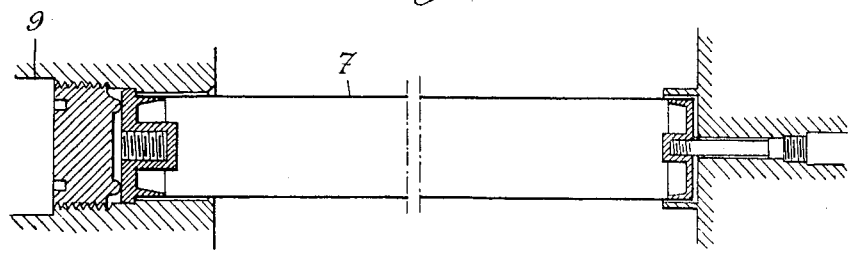
*Fig.4*
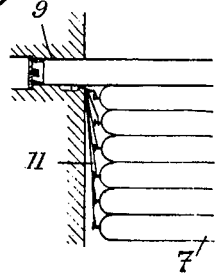
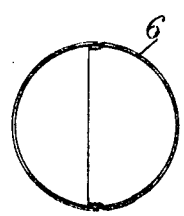
*Fig.6*
*Fig.5*
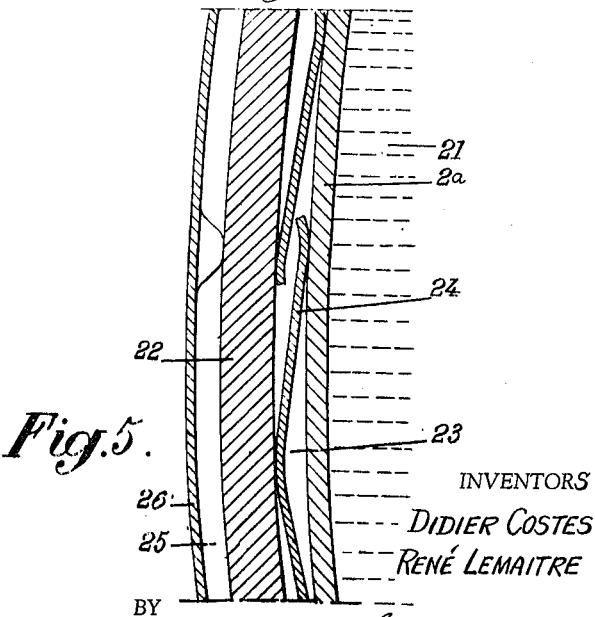
INVENTORS
DIDIER COSTES
RENÉ LEMAITRE
BY
ATTORNEYS Nov. 9, 1965 D. COSTES ETAL 3,216,902
LIQUID MODERATOR NUCLEAR REACTORS
Filed July 10, 1962 3 Sheets-Sheet 2

INVENTORS
DIDIER COSTES
RENÉ LEMAITRE
BY Bacon & Thomas
ATTORNEYS

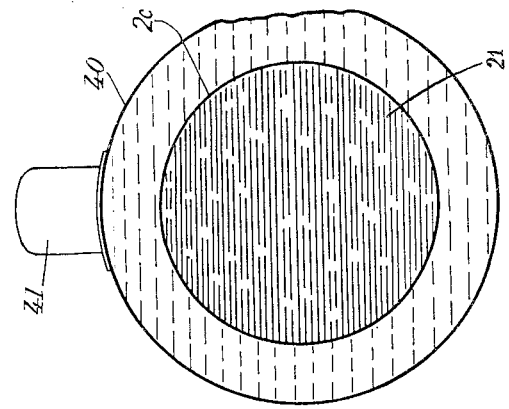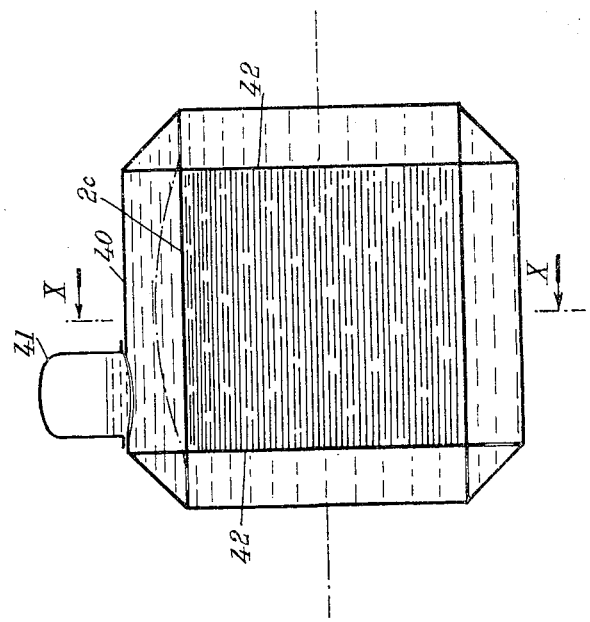

United States Patent Office

3,216,902
Patented Nov. 9, 1965

3,216,902
LIQUID MODERATOR NUCLEAR REACTORS
Didier Costes, Paris, and René Lemaitre, Colombes, France, assignors to Commissariat a l'Energie Atomique, Paris, France
Filed July 10, 1962, Ser. No. 208,857
Claims priority, application France, July 27, 1961, 869,244
11 Claims. (Cl. 176—38)

The invention relates to liquid moderator nuclear reactors having force tubes designed to contain the fuel, and/or to be passed through by a cooling circulation.

It is a particular object of the invention to improve the reliable working of these reactors, by avoiding the harmful consequences for the vessel and structures, likely to result from momentary excess pressure occurring in the interior of the moderator as the result of the rupture of one of the force tubes.

To this end, a nuclear reactor built in accordance with this invention is characterised in that the liquid moderator is separated from the internal surface of the vessel by at least one wall which is deformable under the effect of an excess pressure resulting from the explosion of a tube.

The volume delimited between the moderator and the vessel is therefore variable, as the moderator is able in this contingency to fill the vessel completely without risk of the fracture of the latter.

In one particular embodiment of this invention, the internal surface of the tank is lined with watertight sealed compartments or cushions, with deformable walls, which contain a gas.

In other methods, the liquid moderator is contained in an enclosure with thin walls situated inside the vessel of the reactor; the space defined between this enclosure and the vessel is capable of being reduced either by deformation of the thin wall itself, or by the introduction into this space of a certain amount of moderator, passing through the thin wall via orifices built into it, these orifices being normally covered by resilient members capable of opening under the effects of pressures produced in the core of the reactor.

The invention can, in any case, be easily understood with the aid of the full description which follows, and the drawings attached; the said description and drawings are of course given by way of example.

FIGURE 1 of the drawings represents schematically, a reactor vessel provided with deformable walls or cushions, assuring protection against the accidental explosion of the force tubes;

FIGURE 2 represents a vertical section of a reactor of this type, according to one embodiment of the invention;

FIGURE 3 represents, in axial section, on a larger scale, one of the cushions capable of being installed in such a reactor;

FIGURE 4 shows, in schematic vertical section, a mounting apparatus for the cushions, inside the vessel;

FIGURE 5 shows a spherical cushion to be used in another embodiment of this invention;

FIGURE 6 shows a vertical section of a reactor vessel built according to another embodiment;

Figure 7:
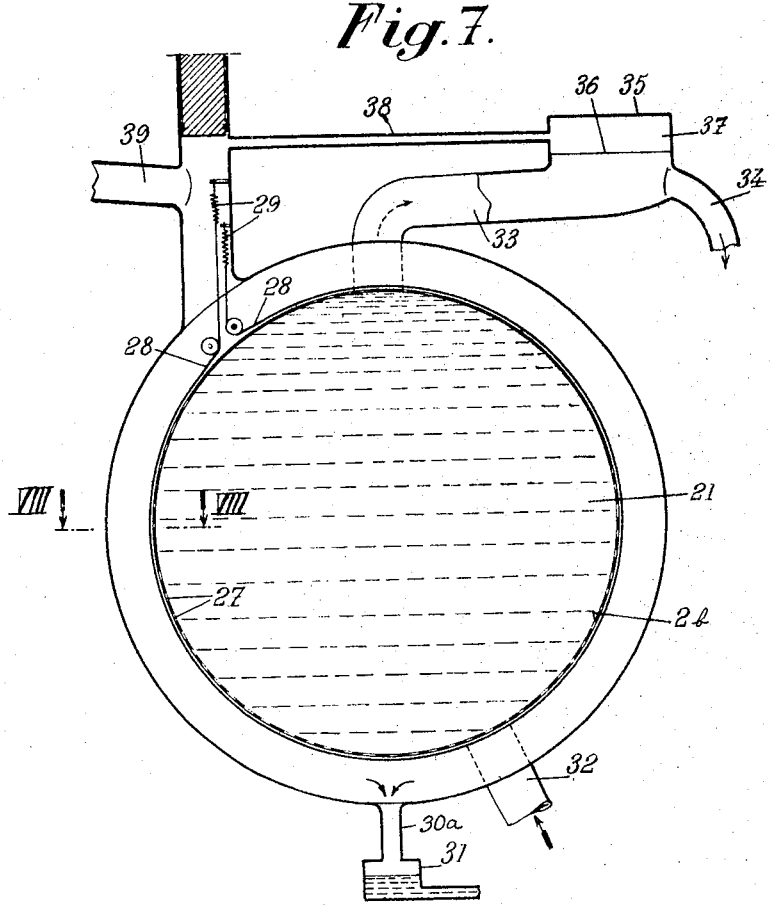
Figure 8:
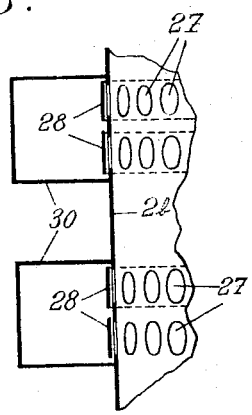

FIGURES 7 and 8 both illustrate, respectively, in transverse and schematic section, on the line VIII—VIII of FIGURE 7, a reactor vessel built according to another embodiment;

FIGURES 9 and 10, finally, illustrate similarly another embodiment of the invention.

It is already known, in the case of a liquid moderator reactor, to leave a free level in the vessel, so that the volumetric elasticity of the gaseous atmosphere on top of the mass of liquid, permits a progressive acceleration, in the evacuation tubes, of the fluid driven off by the explosion of a force tube. Thus the shocks caused in the structures and in the vessel itself are diminished. However, in this solution, the compressible volume is only arranged with difficulty in the most suitable places, especially near the cooling circuit, for the structures which are not wetted by the liquid moderator but are heated by the atomic rays.

The problem is solved, in accordance with this invention, by providing in the reactor, in the interior of the vessel, walls which are capable of yielding, at least locally, in the event of explosion or excess pressure, and thus also of avoiding the deterioration of essential parts, while nevertheless allowing, in the case of a liquid moderator, complete filling of the vessel.

To this end, various methods can be adapted. For example, as shown very schematically by dotted lines in FIGURE 1 (which is a diagram of principles involved), auxiliary walls 1 of this type may be arranged against the internal surface of the rigid wall of the reactor vessel, either on the cylindrical side walls 2 (in the case of a chamber with cylindrical walls) or on the end walls 3, or on both, or on any portion thereof. Alternatively, as represented schematically in FIGURE 1, these auxiliary walls may include hollow enclosures or cushions 4, filled with gas or with some other material which can be deformed by pressure, such enclosures being arranged in the interior of the vessels to be protected.

It should be understood that, in the various cases, the auxiliary walls, whether made of metal, plastic material, or any other suitable material, are chosen so that, in the case of an explosion or high pressure, there would be effective deformation of their surfaces; this deformation can be either elastic (that is, with a return to original shape after absorption of the disturbance) or permanent.

These various walls can be arranged so that they are not deformed in any notable degree except above certain levels of pressure; various values can be adopted in the same vessel.

In the first of the two cases envisaged above, that is to say with auxiliary walls 1 against certain walls of the reactor vessel, these auxiliary walls are made in the form of membranes, with a thickness chosen in relation to the size of the excess pressures to be absorbed.

They are maintained against the walls 2 of the vessel by means of any supports or intercalatory means which are appropriate, particularly elastic wedges (particularly as explained further with reference to FIGURE 6). The space 5 (FIGURE 1) between walls 1 and 2 can be either open to the external air, or sealed and filled with a gas at a convenient pressure, or any other absorbent material so as to cause the external wall of the vessel to share in the resistance to excess pressures. It will be convenient in this case, to provide a cooler separate from the external wall 2. To this effect, a gas can be circulated in the intercalatory enclosure 5, or the exterior wall 2 can be bathed or sprayed with water.

In the drawings the force tubes have been represented schematically at 20 (one only is shown in FIGURE 1).

In the second of the two previous cases, that is, when hollow enclosures or cushions 4 are used (FIGURE 1) these cushions can be fixed in any appropriate manner, and made of any suitable material, in particular of a thin sheet of stainless steel, of aluminium, zirconium alloy, etc. the edges of the sheets being soldered or welded, or even of thin plastic material.

Their shape may also be variable. Thus spherical cushions as shown in FIGURE 5, or cylindrical with a round section, oval, etc. of the type shown at 7 in FIGURES 2 and 4.

These cushions can be filled with an appropriate gas, which is chosen according to its chemical and nuclear properties, in particular relation to the liquid moderator, such as helium or $CO_2$. They can also contain, as well as gas, solids or liquids, which can intervene, notably as moderators or as a shield in relation to radiations. If solids are concerned, they can include a certain percentage of voids to contribute to the absorption of the energy of the explosion.

Further, various methods are foreseen for assuring the positioning of these cushions in the reactor, and also for allowing their removal and replacement.

In the case in which the reactor has for example a cover, the introduction of the cushions and their positioning is particularly easy. In general, these cushions are placed against the walls 2 and 3 of the reactor vessel. To this end, supports such as 8 (FIGURE 2) are provided near these walls to hold the cushions in place and this of course must be done without interfering with the deformation of the cushions during explosion. These means or supports 8 can, for example, consist of netting fixed to the exterior wall 2 by clips or any other analogous method. They can also consist of guides or channels arranged in the bases 3, and suited to co-operate with studs borne by the ends of the cylindrical cushions 7, in cases where such cylinders are used.

If the reactor concerned has no cover which can be easily removed, methods are envisaged to introduce the cushions 6 or 7 above, by orifices or channels, such as are represented at 9, 10, on FIGURES 2 and 3, in combination with other means envisaged for guiding these cushions into the interior of the reactor, in order to guide them to their proper position. It would be convenient, on this topic, to refer to the apparatus described in the U.S. patent application of Didier Costes, filed on May 9, 1962, and accorded Serial Number 193,379. According to these arrangements, cushions such as 7 may be introduced into the lower part of the reactor 10 and pushed successively one after another with the aid of jacks, so as to guide them to their proper positions along the wall 2. Alternatively they may be introduced by conduits 9, formed for example in the upper portion of one end wall 3, and allowed to descend successively along the wall 2, with suitable guidance; and they are held by means of cables such as shown at 11 in FIGURE 4.

It is to be noted that, in the case in which spherical cushions 6 are employed, cushions of different diameters can be used, so as to save space, the small spheres filling the spaces between the bigger ones.

FIGURES 6 to 10, which will now be described, show in a very schematic way, various variants of construction of this invention, from amongst many other possible methods.

FIGURE 6 shows the case of a reactor in which liquid moderator 21 is arranged inside a watertight enclosure 2a, which is sufficiently thin as to be deformable under the effects of excess pressure. The enclosure is supported on the vessel of the reactor proper, and spaced from the rigid reactor wall 22 by means of cushions or elastic wedges, such as illustrated at 24, which are interposed in the intermediate space 23 (assumed to be filled with gas).

This solution, in general, will lead, because of the presence of the gaseous interval 23, to heating of the wall of the vessel 22, which is not cooled by the liquid 21. It will therefore be convenient, in this case, to provide an exterior cooling system 25, notably by water circulating in the space between the vessel and a jacket 26 surrounding it.

FIGURES 7 and 8 show an arrangement according to which a series of parallel rows of orifices 27 are made in the wall of the vessel 2b; these orifices normally being closed by means of shutters, which give way under the action of excess pressure.

These shutter means are constituted for example of metallic bands 28, clamped in surrounding relation on the vessel overlying the orifices 27, the clamps being maintained by springs, shown schematically at 29. FIGURE 8 shows several of these bands 28 partially lifted. In the event of small excess pressures, they are momentarily lifted and are immediately re-applied by the springs 29; in the case of large excess pressures, they can break and must then be replaced.

Lateral outlet pipes 30a leading to a receptacle 31 are provided for these holes and bands. The circulation of the moderator 21 is indicated at 32, 33, 34 combined with an upper reservoir 35. Above the free level 36 of the liquid is an atmosphere 37 of helium in communication with a gaseous circuit 38, 39 to which are linked the pipes 30.

The preceding arrangements thus allow the achievement of a complete filling of the reactor vessel, the deformation of the walls of the enclosure containing liquid moderator or, more generally, the variation of the volume between these walls and the internal surface of the vessel, thus assuring the required result as soon as an excess pressure is produced in the vessel, without risk of damage to the latter and the structures which it contains.

The result is also obtained in the constructions shown in FIGURES 9 and 10, in which it is supposed that the enclosure 2c containing liquid moderator 21 and the force tubes is surrounded by a second enclosure 40 providing a space or chamber, filled, for example, with water, communicating with an expansion dome 41. It is seen that the enclosure 2c can be expanded under conditions of excess pressure by forcing back the water from the enclosure 40 into the dome 41, and without risk of excessive strain. The bases 42 can themselves admit of a filling of water which surrounds the joints of the force tubes at their entry and exit. This water can be made to communicate with that in the enclosure 40, which simplifies the circulation methods.

From the foregoing description it will be seen that not limited to those of its methods of application mentioned, nor to those methods of construction of its various parts which have been more particularly envisaged; it includes, on the contrary, all variations.

We claim:

1. In a liquid moderator nuclear reactor, a reactor vessel comprising rigid outer wall means surrounding the reaction area, a plurality of force tubes mounted within said vessel for mounting fuel cartridges therein and for circulating cooling fluid over said cartridges, said force tubes being immersed in a liquid moderator confined in a space within said vessel, and a deformable means mounted between said force tubes and said rigid outer wall and defining a lining for the internal surface of at least a portion of said rigid outer wall, said deformable means being made up of a plurality of closed, watertight cushions covering a portion of the internal surface of the vessel and being subject to deformation under excessive pressures occurring within said reactor upon the rupture of one of said force tubes, deformation of said deformable means enlarging the space normally occupied by said liquid moderator, whereby an excess of pressure within said reactor vessel due to said rupture will be at least partially absorbed by the deformation of said deformable means to prevent damage to the rest of the reactor structure.

2. A nuclear reactor according to claim 1, in which said cushions are formed by means of thin sheets of soldered or welded metal.

3. A nuclear reactor according to claim 1, in which said cushions are constructed of an envelope of thin plastic material.

4. A nuclear reactor according to claim 1 in which said cushions are filled with a gas.

5. A nuclear reactor according to claim 1 in which said cushions are filled with a solid absorbent material.

6. A nuclear reactor according to claim 1 in which said cushions are partially filled with material that acts as a moderator for radiation.

7. A nuclear reactor according to claim 1, in which said cushions are of spherical shape.

8. A nuclear reactor according to claim 7, in which said cushions are placed against said internal surface of the vessel and are arranged between said surface and a thin, non-watertight wall mounted at a convenient distance inside the vessel.

9. A nuclear reactor according to claim 1 in which said cushions are of cylindrical shape.

10. A nuclear reactor according to claim 9, in which said cushions have studs at the ends which are guided along the internal surface of the vessel for the positioning of the cushions.

11. In a liquid moderator nuclear reactor, a reactor vessel comprising rigid outer wall means surrounding the reaction area, a plurality of force tubes mounted within said vessel for mounting fuel cartridges therein and for circulating cooling fluid over said cartridges, said force tubes being immersed in a liquid moderator confined in a space within said vessel, and a deformable means mounted between said force tubes and said rigid outer wall and defining a lining for the internal surface of at least a portion of said rigid outer wall, said deformable means consisting of a thin, watertight wall separated from said internal surface of the vessel and attached to it by intervening elastic wedges and being subject to deformation under excessive pressures occurring within said reactor upon the rupture of one of said force tubes, deformation of said deformable means enlarging the space normally occupied by such liquid moderator, whereby an excess of pressure within said reactor vessel due to said rupture will be at least partially absorbed by the deformation of said deformable means to prevent damage to the rest of the reactor structure.

References Cited by the Examiner

UNITED STATES PATENTS

| | | | |
|---|---|---|---|
| 2,743,225 | 4/56 | Ohlinger et al. | 176—58 |
| 2,811,487 | 10/57 | Stanton | 176—39 |
| 2,922,344 | 1/60 | Meissmer. | |
| 2,944,692 | 7/60 | Farrell et al. | 220—9 |
| 2,944,693 | 7/60 | Benson et al. | 220—9 |
| 2,945,794 | 7/60 | Winters et al. | 176—39 |
| 2,977,297 | 3/61 | Evans et al. | 176—52 |
| 3,005,567 | 10/61 | White | 220—9 |
| 3,026,256 | 3/62 | Liljeblad et al. | 176—52 |
| 3,088,621 | 5/63 | Brown | 220—9 |
| 3,108,053 | 10/63 | Vrillon et al. | 176—64 |

REUBEN EPSTEIN, *Primary Examiner.*

CARL D. QUARFORTH, *Examiner.*